(12) United States Patent
Kobuchi et al.

(10) Patent No.: US 11,515,104 B2
(45) Date of Patent: Nov. 29, 2022

(54) MICROSWITCH AND OPERATING DEVICE

(71) Applicant: OMRON Corporation, Kyoto (JP)

(72) Inventors: Keiichiro Kobuchi, Okayama (JP); Yoshinori Ijiri, Kurayoshi (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 16/971,321

(22) PCT Filed: Mar. 6, 2019

(86) PCT No.: PCT/JP2019/008870
§ 371 (c)(1),
(2) Date: Aug. 20, 2020

(87) PCT Pub. No.: WO2019/176689
PCT Pub. Date: Sep. 19, 2019

(65) Prior Publication Data
US 2021/0090824 A1 Mar. 25, 2021

(30) Foreign Application Priority Data
Mar. 15, 2018 (JP) .............................. JP2018-047494

(51) Int. Cl.
*H01H 13/06* (2006.01)
*H01H 13/14* (2006.01)
(Continued)

(52) U.S. Cl.
CPC ............ *H01H 13/06* (2013.01); *H01H 13/14* (2013.01); *H01H 13/20* (2013.01); *G06F 3/0202* (2013.01); *G06F 3/03543* (2013.01)

(58) Field of Classification Search
CPC ........ H01H 13/06; H01H 13/14; H01H 13/20; H01H 13/36; H01H 3/12; H01H 9/40;
(Continued)

(56) References Cited

U.S. PATENT DOCUMENTS 7,355,137 B2 * 4/2008 Kawasaki ............... H04M 1/18
200/302.2
8,542,482 B2 * 9/2013 Hsiung ................ H04M 1/236
361/679.3
(Continued)

FOREIGN PATENT DOCUMENTS

CN    1447362 A    10/2003
CN    1881498 A    12/2006
(Continued)

OTHER PUBLICATIONS

An English translation of the International Search Report ("ISR") of PCT/JP2019/008870 dated Jun. 11, 2019.
(Continued)

*Primary Examiner* — Lheiren Mae A Caroc
(74) *Attorney, Agent, or Firm* — Metrolex IP Law Group, PLLC

(57) ABSTRACT

A microswitch includes a contact chamber that accommodates a contact mechanism that opens and closes an electrical circuit; an enclosure that accommodates the contact chamber; and a pressing component that accepts a pressure external to the enclosure. The pressing component may include an insertion part that is inserted into an insertion hole in the contact chamber and acts on the contact mechanism, the insertion part receiving a pressure external thereto and moving from a first side that is outward of the enclosure to a second side that is inward of the enclosure. The pressing component may include a shielding part that shields the insertion hole from the contact chamber side, the shielding part being larger than the insertion hole in a direction orthogonal to an insertion direction to block the insertion hole.

8 Claims, 10 Drawing Sheets

(51) Int. Cl.
*H01H 13/20* (2006.01)
*G06F 3/02* (2006.01)
*G06F 3/0354* (2013.01)

(58) Field of Classification Search
CPC ...... H01H 13/50; H01H 13/52; G06F 3/0202; G06F 3/03543; G06F 3/02; G06F 3/0354
See application file for complete search history.

(56) References Cited

U.S. PATENT DOCUMENTS

| | | | | |
|---|---|---|---|---|
| 9,040,855 | B2* | 5/2015 | Werner | H01H 13/063 200/302.2 |
| 2007/0034493 | A1 | 2/2007 | Kawasaki et al. | |
| 2009/0159412 | A1* | 6/2009 | Liu | H01H 13/84 200/302.3 |
| 2010/0294636 | A1 | 11/2010 | Peng | |
| 2014/0124343 | A1* | 5/2014 | Lee | H04M 1/026 200/302.2 |
| 2021/0090825 | A1* | 3/2021 | Fujino | G05B 15/02 |

FOREIGN PATENT DOCUMENTS

| | | |
|---|---|---|
| CN | 201081807 Y | 7/2008 |
| CN | 201285720 Y | 8/2009 |
| CN | 201438429 U | 4/2010 |
| CN | 103141032 A | 6/2013 |
| JP | S63-145228 U | 9/1988 |
| JP | H2-108224 U | 8/1990 |
| JP | H3-112836 U | 11/1991 |
| JP | H6-17053 U | 3/1994 |
| JP | 2003-288820 A | 10/2003 |
| JP | 2007-42359 A | 2/2007 |
| JP | 2017-16807 A | 1/2017 |

OTHER PUBLICATIONS

The Written Opinion("WO") of PCT/JP2019/008870 dated Jun. 11, 2019.
The Chinese Office Action ("CNOA") dated Jan. 5, 2022 in a counterpart Chinese application.
Chinese Office Action dated Oct. 10, 2022 in a counterpart Chinese patent application.

* cited by examiner

MICROSWITCH AND OPERATING DEVICE

FIELD

The present invention relates to a microswitch for receiving pressure external thereto to open and close an electrical circuit, and an operating device using such a microswitch.

BACKGROUND

The microswitch, which may be used in devices, such as an electronic device, are becoming increasingly popular. As an example, Patent Document 1 discloses a microswitch which protrudes outside of a cover; the microswitch includes a pushbutton that can be pressed while the cover is in place. The microswitch disclosed in Patent Document 1 is such that a movable contact piece therein allows current to flow between a common contact terminal and a normally-closed contact terminal when the pushbutton is not pressed; and pressing the pushbutton causes the movable contact piece to allow current to flow between the common contact terminal and a normally-open contact terminal.

RELATED ART DOCUMENTS

Patent Documents

[Patent Document 1] Japanese Patent Publication No. 2017-16807

SUMMARY

Technical Problem

The microswitch disclosed in Patent Document 1 is able to extend the operating life thereof without increasing the external size.

However, the present inventors have discovered that a microswitch with the pushbutton protruding outside the cover invites the slight possibility that a foreign object may enter therein from the gap between the microswitch and the cover; furthermore, foreign objects that enter from the gap are also a concern since the foreign objects may affect the movable contact piece, the common contact terminal, the normally-closed contact terminal, and the normally-open contact terminal.

In light of the foregoing issues, the present invention aims to provide a microswitch capable of minimizing the effect of foreign objects that enter therein from a gap.

The present invention also aims to provide an operating device that uses this kind of microswitch.

Solution to Problem

To address the forgoing, a microswitch as described herein includes a contact chamber that accommodates a contact mechanism that opens and closes an electrical circuit; an enclosure that accommodates the contact chamber; and a pressing component that accepts a pressure external to the enclosure; the pressing component including: an insertion part that is inserted into an insertion hole in the contact chamber and acts on the contact mechanism, the insertion part receiving a pressure external thereto and moving from a first side that is outward of the enclosure to a second side that is inward of the enclosure; and the pressing component includes a shielding part that shields the insertion hole from the contact chamber side; and the shielding part is larger than the insertion hole in a direction orthogonal to an insertion direction to block the insertion hole.

In the microswitch, the shielding part is plate-shaped, and includes a peripheral wall formed protruding at the rim of the shielding part toward the first side.

In the microswitch, a surface on a first side of the shielding part is sticky.

In the microswitch, the shielding part is sticky due to a coating of an adhesive compound or due to adhering an adhesive component.

In the microswitch, the enclosure includes a guide wall around the rim of the shielding part of the pressing component for guiding the insertion operation of the pressing component.

Furthermore, an operating device described herein includes a pressing operation part that accepts a pressing operation external thereto; and a microswitch; the pressing operation part transmitting the pressing operation accepted thereby to the microswitch as a pressure external to the microswitch; and the operating device outputting a signal on the basis of an operation of a contact mechanism in the microswitch.

A microswitch and an operating device as described herein facilitates preventing the intrusion of a foreign object into the contact chamber.

Effects

A microswitch and an operating device according to the present invention include an insertion part that is inserted in an insertion hole provided in a contact chamber. Moreover, a pressing component, which accepts a pressure external thereto is provided with a shielding part for shielding the insertion hole from the contact chamber side. Thus, excellent effects may be provided, such as protecting the insertion hole from foreign objects, and minimizing the adverse impact from foreign objects.

DETAILED DESCRIPTION

Figure 1:
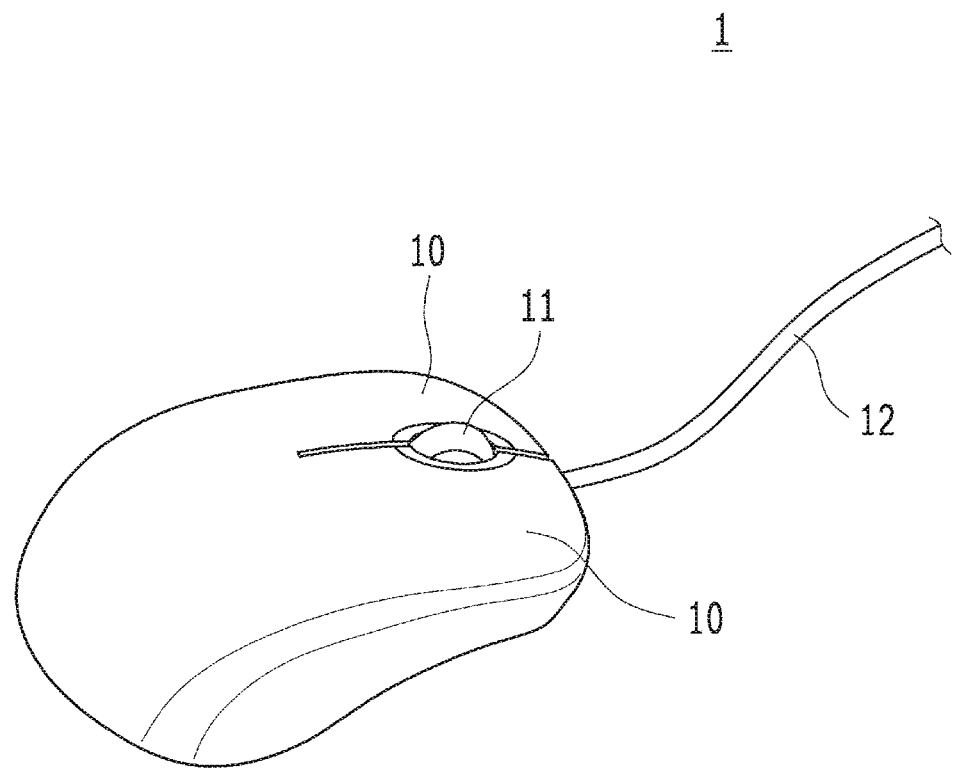
FIG. 1 is a schematic perspective view illustrating an example of the external features of an operating device described herein.

Embodiments of the present invention are described in detail below with reference to the drawings.

Example Application

The operating device described herein may be used as an operating device such as a mouse, which is used for providing operational input to a personal computer (referred to below as a PC). The microswitch described herein may be used in devices such as various kinds of electronic devices which contain an operating device. An operating device 1 and microswitch 2, which are depicted in the drawings, are described below while referencing the drawings.

Operating Device 1

First, the operating device 1 is described. FIG. 1 is a schematic perspective view illustrating an example of the external features of an operating device 1 described herein; FIG. 1 depicts an example of the operating device 1 described herein adopted in a mouse which is used to provide operational input to an electronic device such as a PC. The operating device 1 is equipped with a pressing operation part 10, and a rotating operation part 11. The pressing operation part 10 may be a mouse button or the like that receives operational input which is the press of an operator's finger; and the rotating operation part 11 may be a mouse wheel or the like that receives operational input which is a rotation by an operator's finger. Note that the rotating operation part 11 is not just for rotational operation, but may also be configured for receiving a pressing operation to also function as a pressing operation part 10. A signal line 12 may also be connected to the operating device 1 for outputting an electrical signal to an external machine such as a PC. The operating device 1 is not limited to wired communication using the signal line 12; the operating device 1 may output an electrical signal via a variety of communication methods, for instance, via wireless communication.

The operating device 1 houses a microswitch 2 (later described) for each pressing operation part 10 and rotating operation part 11 therein; when a pressing operation is performed on a pressing operation part 10, a part inside the pressing operation part 10 pushes the corresponding microswitch 2. The microswitch 2 outputs a signal based on the pressing state from the signal line 12 to an external electronic device such as a PC.

In other words, the operating device 1 described herein is equipped with a pressing operation part 10 for receiving a pressing operation external thereto and a rotating operation part 11 for receiving an operation such as a rotation operation, and further the microswitch 2 on the inside. The pressing operation accepted by the pressing operation part 10 and/or the rotating operation part 11 is transmitted to the microswitch 2 as a pressure external thereto, and the operating device 1 outputs a signal to an external electronic device on the basis of the movement of the microswitch 2.

Microswitch 2

Next, the microswitch 2 is described. In the present application, a plurality of modes are described as examples of embodiments of the microswitch 2.

First Embodiment

Figure 2:
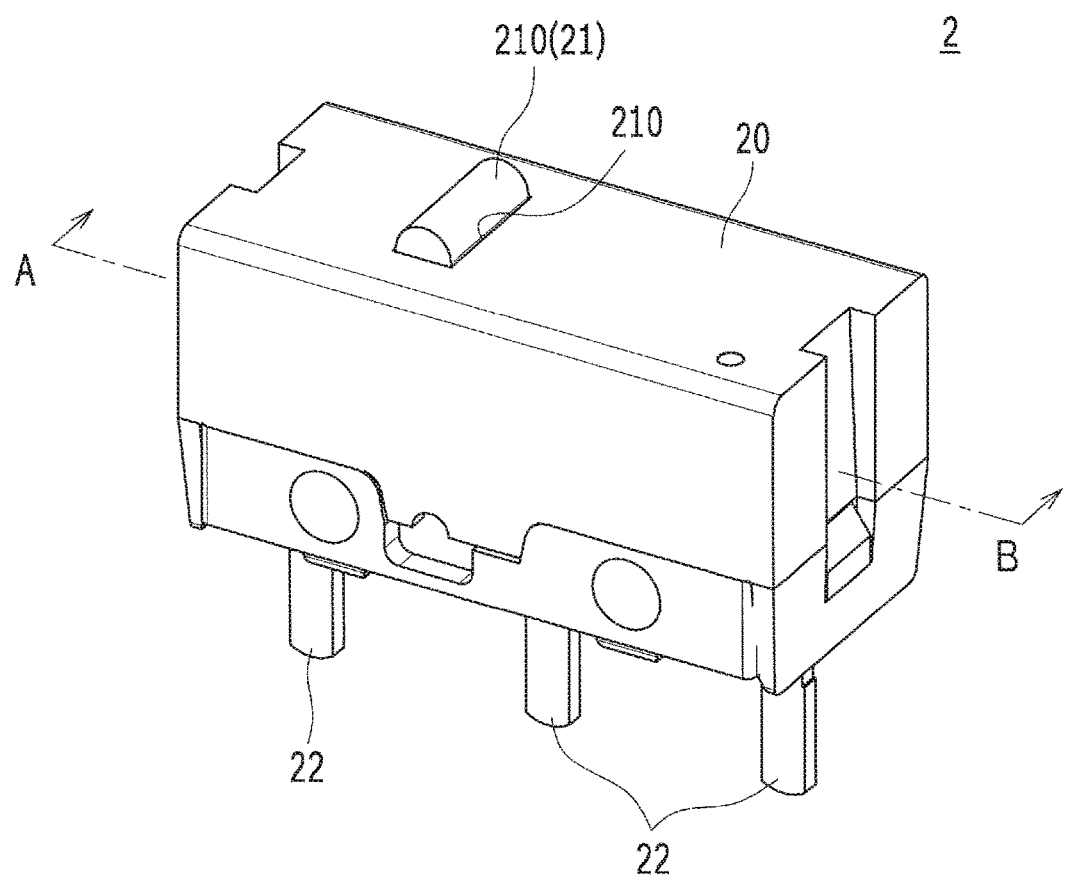
FIG. 2 is a schematic perspective view illustrating an example of the external features of a microswitch described herein.

FIG. 2 is a schematic perspective view illustrating an example of the external features of a microswitch 2 described herein; FIG. 2 depicts a microswitch 2 according to a first embodiment. With regard to the directions of the microswitch 2 herein, when facing FIG. 2 the left anterior is described as the rear, the right back is described as the rear, the upper part is described as the top, and the lower part is described as the bottom; this as a matter of convenience in the description and not intended to limit the direction when assembling the microswitch 2. The above-described microswitch 2 is housed inside an electronic device such as an operating device 1; the microswitch 2 accepts a pressing operation that is accepted by a part in the operating device 1 such as the pressing operation part 10 as a pressure external thereto.

The microswitch 2 is provided with an enclosure 20 that is a roughly rectangular shape. The enclosure 20 is formed with a base at the lower part and a cover at the upper part. The upper surface of the enclosure 20 includes a rectangular insertion hole 200 that in front view is located toward the left of center; a pressing component 21 can be inserted in the insertion hole 200. The pressing component 21, which is inserted in the insertion hole 200 receives a pressure external to the enclosure 20 and travels vertically; a bump-for-pressing 210 protrudes from the upper surface of the enclosure 20 at the upper part of the pressing component 21. Moreover, three contact terminal parts 22, which are metal pieces that allow connection to another electrical component, protrude from the lower side of the enclosure 20.

A microswitch 2, thusly configured, allows the pressing operation external thereto accepted by the operating device 1 to be transmitted to the pressing component 21 via the bump-for-pressing 210 as a pressure external to the enclosure 20. The pressing component 21 receives a pressure external thereto and moves downward, which is toward inside the enclosure 20; when the pressure external thereto is released, the pressing component 21 moves upward, which is toward the outside of the enclosure 20. That is, on accepting the pressure external thereto, the pressing component 21 moves from a first side which is outward of the enclosure 20 to a second side which is inward of the enclosure 20; and further, when relieved of the pressure, the pressing component 21 moves from the second side to the first side.

Figure 3:
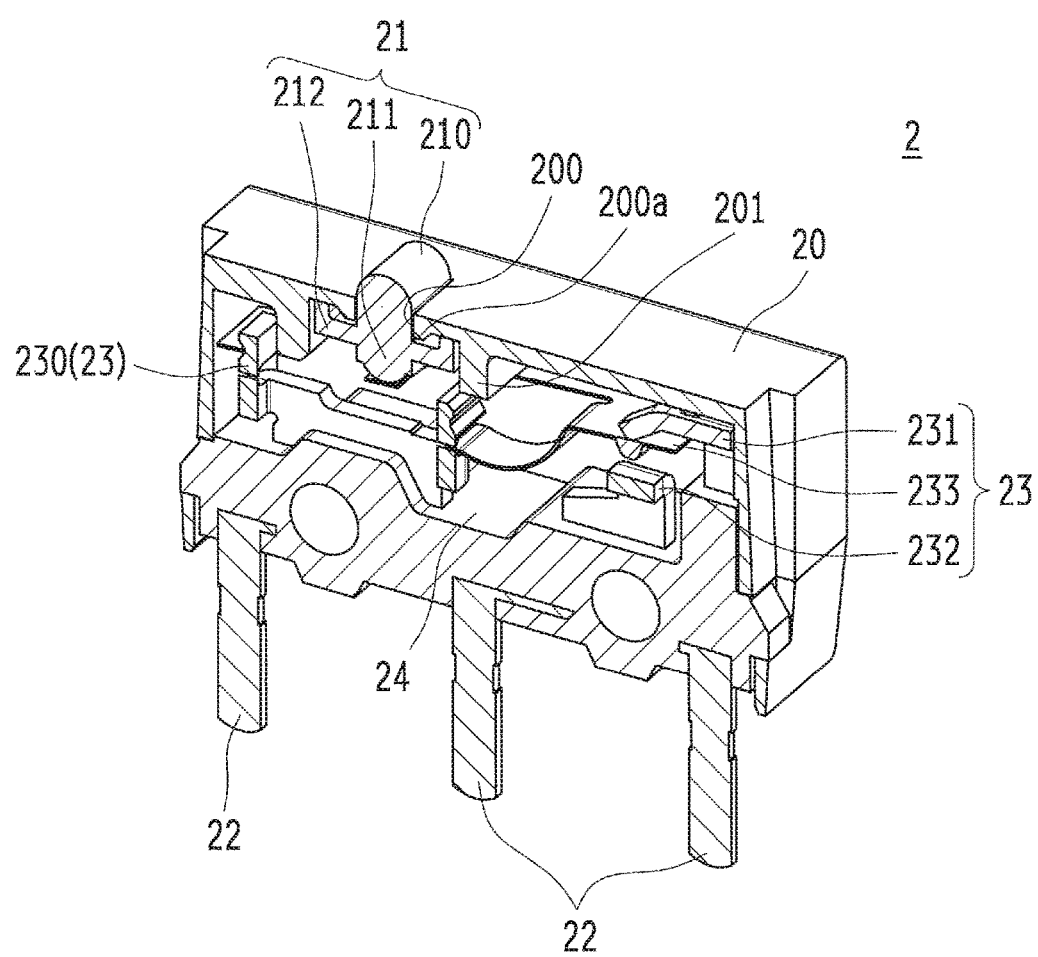
FIG. 3 is a schematic cross-sectional perspective view illustrating an example of the external features and a cross section of a microswitch described herein.
Figure 4:
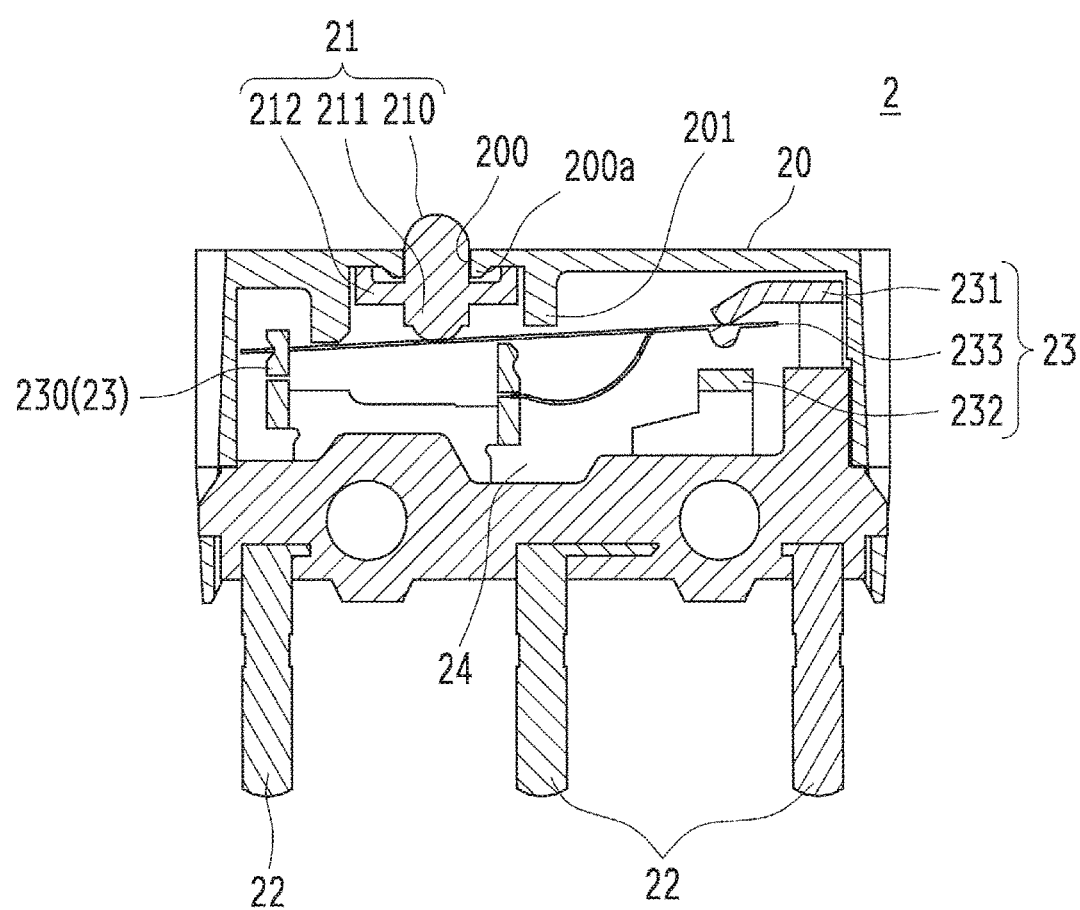
FIG. 4 is a schematic cross-sectional view illustrating an example of a cross section of a microswitch described herein.

The internal structure of the microswitch 2 is described next. FIG. 3 is a schematic cross-sectional perspective view illustrating an example of the external features and a cross section of a microswitch 2 described herein; and FIG. 4 is a schematic cross-sectional view illustrating an example of a cross section of a microswitch 2 described herein. FIG. 3 and FIG. 4 depict the microswitch 2 according to the first embodiment and illustrate the cross-section cut along a vertical plan including the line segment A-B shown in FIG. 2. FIG. 3 depicts a viewpoint where the directions are identical to the directions in FIG. 2. FIG. 4 is a view from the front.

An area established inside the enclosure 20 for the microswitch 2 serves as a contact chamber 24 for housing a contact mechanism 23 that acts as a switch to open and close an electrical circuit. The insertion hole 200, which passes through the enclosure 20 from the outside, is opened at the upper surface of the contact chamber 24; and the pressing component 21 is inserted in the insertion hole 200.

Figure 5:
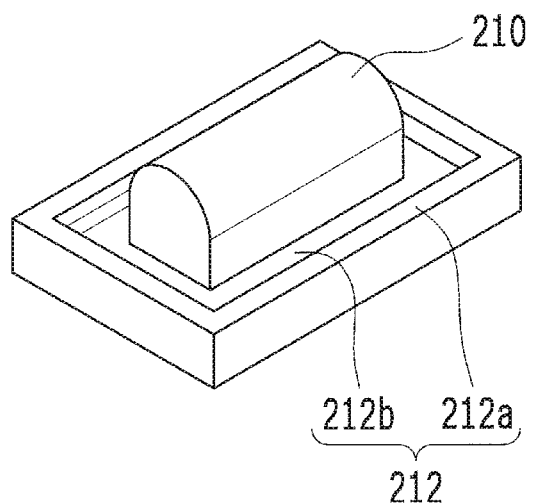
FIG. 5 is a schematic perspective view illustrating an example of the external features of a press component provided to a microswitch described herein.

FIG. 5 is a schematic perspective view illustrating an example of the external features of the press component 21 provided to the microswitch 2 described herein; the pressing component 21 is described in detail with reference to FIG. 3 through FIG. 5. The pressing component 21 is shaped as a combination of a main part that is long and roughly rectangular in the vertical direction, and a plate that widens horizontally from around the center in the vertical direction. The pressing component 21 appears to be substantially a cross in front view. The main part of the pressing component 21 is formed to be longer lengthwise than compared to the lateral direction when viewed from above. The upper part of the pressing component 21 forms the bump-for-pressing 210 which protrudes from the upper surface of the enclosure 20, with the upper end of the pressing component 21 curved in the form of an arch. The pressing component 21 is inserted in the insertion hole 200 and moves vertically inside the contact chamber 24; the lower part of the pressing component 21 is formed to serve as an insertion part 211 with the lower end thereof curving in the form of an arch. The insertion part 211 of the pressing component 21 transmits the vertical movement of the pressing component 21 into the contact chamber 24 and acts on the contact mechanism 23 inside the contact chamber 24.

Moreover, a shielding part 212 for shielding the insertion hole 200 from the contact chamber 24 side is plate-shaped, and widens horizontally from near the center of the pressing component 21. The shielding part 212 is formed to extend sideways from the main part of the pressing component 21.

The shielding part 212 appears roughly rectangular when viewed from above, and is formed so that the insertion part 211 of the pressing component 21 passes through at the center. That is, with regard to the size in the horizontal direction which is orthogonal to the insertion direction when viewed from above, the shielding part 212 is formed to be larger than the insertion part 211 and the insertion hole 200; therefore, the shielding part 212 is formed to block the insertion hole 200 from below. Note that, having the shielding part 212 block the insertion hole 200, as described here, means that the shape, size, or positional relationship thereof in the horizontal direction, which is orthogonal to the insertion direction, is such that no portion of the insertion hole is out-of-bounds relative to the shielding part 212. The shielding part 212 forms a rectangular plate, and the rim of the shielding part 212 includes a peripheral wall 212a that protrudes toward the upper part which is the first side. Near the upper surface of the shielding part 212 is an inner bottom part 212b that is surrounded by the peripheral wall 212a.

A description of inside the contact chamber 24 is provided here with reference to FIG. 3 and FIG. 4. The wall surface of the insertion hole 200 in the upper surface of the contact chamber 24 protrudes downward and creates an inner wall part 200a. A guide wall 201 is formed protruding downward from the upper surface of the contact chamber 24 to surround the rim of the edge part of the shielding part 212; the guide wall is formed to extend to below the shielding part 212. The pressing component 21 is surrounded by the insertion hole 200 and the inner wall part 200a with a little gap around the insertion part 211, and surrounded by the guide wall 201 with a little gap around the shielding part 212. Accordingly, the pressing component 21 moves reliably during a vertical motion thereof since the insertion hole 200 and inner wall part 200a as well as the guide wall 201 guides the pressing component 21.

The contact mechanism 23 housed inside the contact chamber 24 is described next. A common contact terminal 230, a first contact terminal 231, a second contact terminal 232, a movable contact piece 233 and the like inside the contact chamber 24, function as the contact mechanism 23. The common contact terminal 230 is arranged on the left side inside the contact chamber 24, and is electrically to a left-side contact terminal part 22 on the left side. The first contact terminal 231 is arranged on the right side inside the contact chamber 24 and is electrically to a right-side contact terminal part 22. The second contact terminal 232 is arranged on the lower right side inside the contact chamber 24 and is electrically to the center contact terminal part 22.

The movable contact piece 233 is a conductive metal plate-like component that extends left to right inside the contact chamber 24. The left end of the movable contact piece 233 is moored to the common contact terminal 230 and is the fixed end of the movable contact piece. The right end of the movable contact piece 233 moves freely between the first contact terminal 231 and the second contact terminal 232 and is the free end that serves as the movable contact. The movable contact piece 233 may be produced by punching out near the center part and bending the piece into a circular shape to create a return spring; the return spring may be fixed in the contact chamber 24.

With a contact mechanism 23 thusly configured, each time the pressing component 21 is pressed, the insertion part 211 moves downward and the movable contact piece 233 is pressed. The pressing of the movable contact piece 233 causes the right end side, which is the free end of the movable contact piece 233 to descend and contact the second contact terminal 232. Hereby, the left-side contact terminal part 22 which is connected to the common contact terminal 230, and the center contact terminal part 22 which is connected to the second contact terminal 232 allow a current to flow.

When the pressure on the pressing component 21 is released, the return spring biases the movable contact piece 233 upward. The upward bias on the movable contact piece 233 causes the insertion part 211 (the pressing component 21) to move upward. Further, the upward bias on the movable contact piece 233 due to the return spring thereby causes the right end side, which is the free end of the movable contact piece 233 to ascend and contact the first contact terminal 231. Hereby, the left-side contact terminal part 22 which is connected to the common contact terminal 230, and the right-side contact terminal part 22 which is connected to the first contact terminal 231 allow a current to flow. Note that the FIG. depicts a state where the pressing component 21 is not pressed.

The contact mechanism 23 provided as an example herein is simply one example of an embodiment of the microswitch 2 described herein which can be deployed in various forms. The microswitch 2 herein can adopt various contact mechanisms 23 where pressure of the insertion part 211 opens or closes a circuit or separates contact. For instance, various mechanisms may be adopted such as the mechanisms described in Japanese Patent Publication Number 2017-16807 which was disclosed by the present inventors.

Figure 6A:
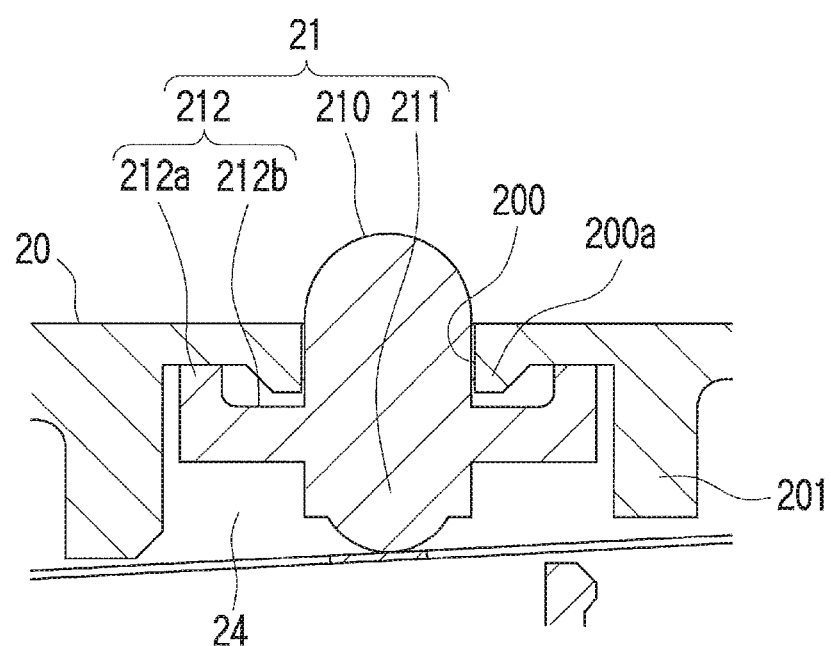
FIG. 6A is an exploded schematic cross-sectional view illustrating an exploded cross-section of the microswitch described herein.
Figure 6B:
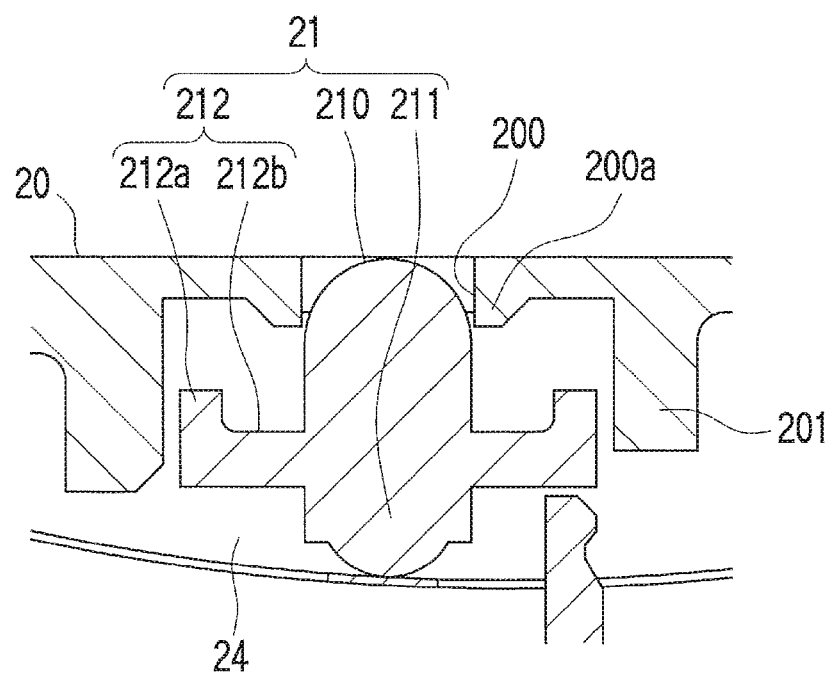
FIG. 6B is an exploded schematic cross-sectional view illustrating an exploded cross-section of the microswitch described herein.

The function of a microswitch 2 according to the above-configured first embodiment herein is described next. FIG. 6A and FIG. 6B are exploded schematic cross-sectional views illustrating a magnification of one portion in a cross-section of the microswitch 2 described herein; FIG. 6A and FIG. 6B are exploded cross sections centered on the contact chamber 24 in the microswitch 2 and which are depicted schematically to facilitate recognizing the relationship between the location of the pressing component 21 and the other components. FIG. 6A illustrates the state when the pressing component 21 is at the upper side and not subject to an external pressure; and FIG. 6B illustrates the state when the pressing component 21 is subject to an external pressure and is at the lower side.

The pressing component 21 is pressed and moves down, whereby the pressing component 21 transitions from the state illustrated in FIG. 6A to the state illustrated in FIG. 6B.

When the pressure on the pressing component 21 is released, the pressing component 21 moves up, transitioning from the state illustrated in FIG. 6B to the state illustrated in FIG. 6A. In either of the states illustrated in FIG. 6A and FIG. 6B, the shielding part 212 protects the insertion hole 200.

There are cases where a gap may be created in the operating device 1, such as a mouse or the like provided with the microswitch 2 described herein depending on [due to] the structure. If a foreign object, such as lint or the like, were to enter from the gap in the operating device 1, a foreign object tends not to invade up to the contact chamber 24 because the microswitch 2 is protected by the enclosure 20, and the contact chamber 24 is housed inside the enclosure 20. In other words, the contact chamber 24 is a closed structure; and this prevents the occurrence of a malfunction such as a defective contact due to a foreign object adhering to a component inside the contact chamber 24. The dust resistance function of the microswitch 2 is described below assuming that a foreign object has entered into the operating device 1 and the hypothetical route of the foreign object up until the foreign object invades the contact chamber 24.

The insertion hole 200 into which the insertion part 211 of the pressing component 21 is inserted is established in the top part of the contact chamber 24. However, since the shielding part 212 is below the insertion hole 200 as illustrated in FIG. 6A and FIG. 6B, a foreign object remains at the inner bottom part 212b of the shielding part 212 even if the foreign object enters from the gap between the insertion part 211 and the insertion hole 200, and does not fall directly into the contact chamber 24.

The inner bottom part 212b of the shielding part 212 surrounds the peripheral wall 212a; therefore, a foreign object stopped at the inner bottom part 212b tends not to move past the peripheral wall 212a to enter contact chamber 24. The space between the upper end of the peripheral wall 212a and the upper surface of the contact chamber 24, in particular, has only a slight gap; when the pressing component 21 is up as illustrated in FIG. 6A, the peripheral wall 212a substantially abuts the upper surface of the contact chamber 24 and therefore, a foreign object cannot easily move pass the peripheral wall 212a.

Second Embodiment

The second embodiment is configured from imparting stickiness to the inner bottom part 212b of the pressing component 21 of the first embodiment. Note that in the description below the elements of the configuration that are identical to the elements in the first embodiment are given the same reference numerals, with a description of those elements omitted assuming that the description of the first embodiment may be referenced.

Figure 7:
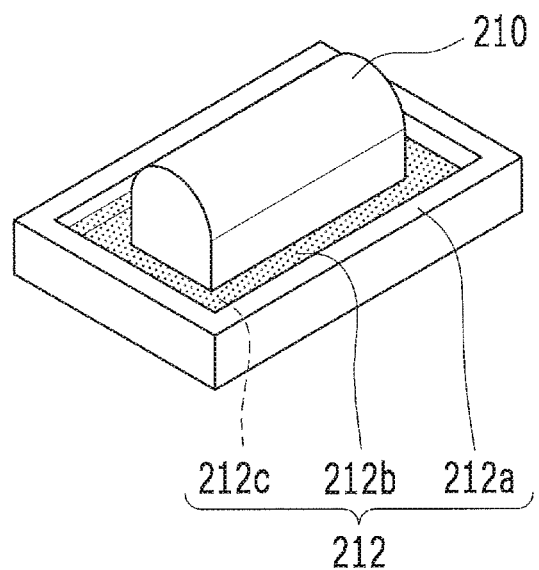
FIG. 7 is a schematic perspective view illustrating an example of the external features of a pressing component provided to a microswitch described herein.

FIG. 7 is a schematic perspective view illustrating an example of the external features of a pressing component 21 provided to a microswitch 2 described herein; The pressing component 21 according to the second embodiment is the pressing component 21 according to the first embodiment with stickiness added to a surface of a first side of the shielding part 212. In FIG. 7, the inner bottom part 212b which surrounds the peripheral wall 212a of the shielding part 212 is coated with a semi-liquid material that is sticky, e.g., an adhesive compound 212c, such as grease or the like. Note that if the inner bottom part 212b is to be made sticky, this is not limited to adding a semi-liquid material such as the adhesive compound 212c; an adhesive component such as adhesive sheet may be adhered to the inner bottom part 212b.

Figure 8A:
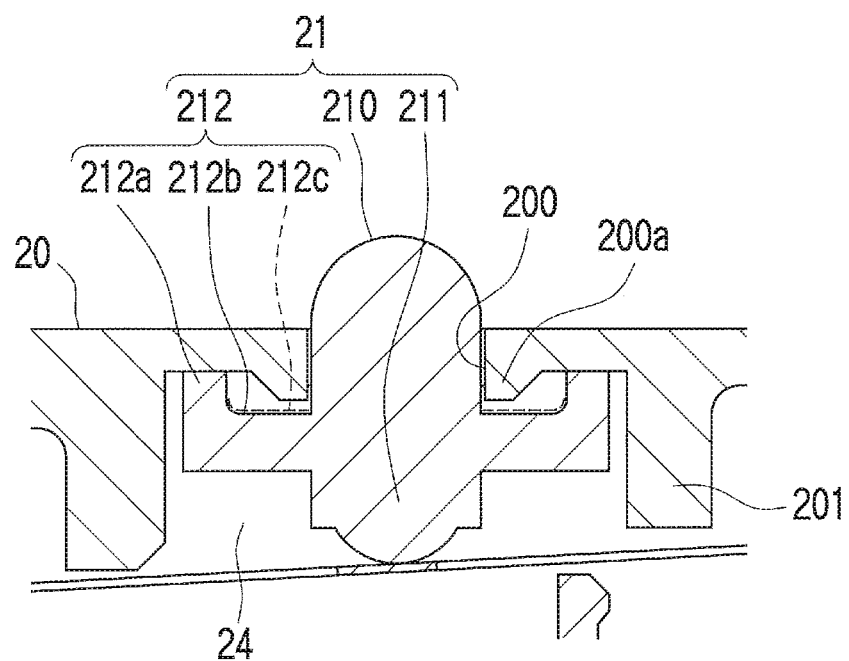
FIG. 8A is an exploded schematic cross-sectional view illustrating an exploded cross-section of the microswitch described herein.
Figure 8B:
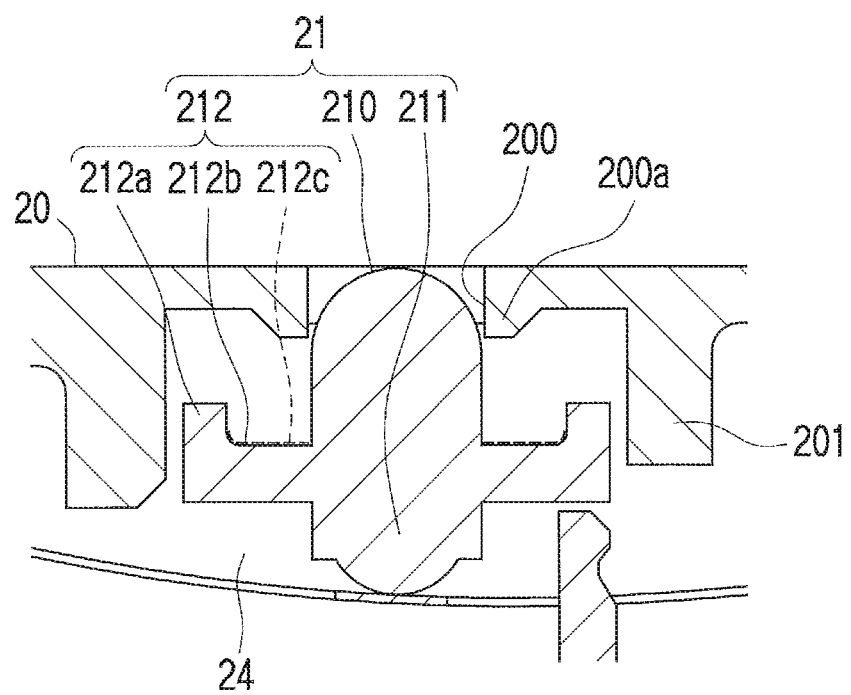
FIG. 8B is an exploded schematic cross-sectional view illustrating an exploded cross-section of the microswitch described herein.

FIG. 8A and FIG. 8B are exploded schematic cross-sectional views illustrating a magnification of one portion in a cross-section of the microswitch 2 described herein; FIG. 8A and FIG. 8B are exploded cross sections centered on the contact chamber 24 in the microswitch 2 and which are depicted schematically to facilitate recognizing the relationship between the location of the pressing component 21 and the other components. FIG. 8A illustrates the state when the pressing component 21 is at the upper side and not subject to an external pressure; and FIG. 8B illustrates the state when the pressing component 21 is subject to an external pressure and is at the lower side.

The pressing component 21 is pressed and moves down, whereby, the pressing component 21 transitions from the state illustrated in FIG. 8A to the state illustrated in FIG. 8B. When the pressure on the pressing component 21 is released, the pressing component 21 moves up, transitioning from the state illustrated in FIG. 8B to the state illustrated in FIG. 8A.

The route of a foreign object is described assuming a case where the foreign object entered the microswitch 2 according to the second embodiment. The insertion hole 200 into which the insertion part 211 of the pressing component 21 is inserted is established in the top part of the contact chamber 24. However, since the shielding part 212 is below the insertion hole 200 as illustrated in FIG. 8A and FIG. 8B, a foreign object remains at the inner bottom part 212b of the shielding part 212 even if the foreign object enters from the gap between the insertion part 211 and the insertion hole 200, and does not fall directly into the contact chamber 24.

The inner bottom part 212b of the shielding part 212 surrounds the peripheral wall 212a; therefore, a foreign object stopped at the inner bottom part 212b tends not to move past the peripheral wall 212a to enter contact chamber 24. Moreover, given that the inner bottom part 212b is coated with an adhesive compound 212c such as grease, the foreign object that falls onto the inner bottom part 212b heres to the adhesive compound 212c, and cannot easily move past the peripheral wall 212a. The adhesive compound 212c which coats the inner bottom part 212b does not contact the top part of the inner wall part 200a even when the pressing component 21 moves up as illustrated in FIG. 8A.

As above described with the first embodiment and the second embodiment as examples, the microswitch 2 described herein is highly resistant to dust, and even if a foreign object enters into the operating device 1, it tends to be difficult for the intruding foreign object to invade up to the contact chamber 24 of the microswitch 2. Thus is provided excellent effects such as minimizing the occurrence of abnormalities due to the intrusion of a foreign object, e.g., makes it possible to prevent the occurrence of an operation malfunction.

Note that the effect provided by the microswitch 2 described is not just that of dust resistance. As an example, the insertion part 211 of the pressing component 21 of the microswitch 2 is inserted into the insertion hole and engaged therewith having a little gap with the inner wall part 200a extending from the insertion hole 200. The peripheral wall 212a of the shielding part 212 also surrounds the guide wall 201 with a little gap therebetween. Hereby, the insertion part 211 moves straight, without tilt, when the pressing component 21 is pressed. Accordingly, excellent effects may be provided such as preventing an operation defect or movement defect from occurring when the pressing component is pressed, or the like.

The present invention is not limited to the above described embodiments and may be implemented in various other ways. Therefore, in all respects the above embodiments are merely examples and should not be interpreted as limitations. The scope of the present invention is delineated by the claims and nothing in the specification restricts the scope of the present invention. Moreover, all modifications and variations with a scope equivalent to the claims are within the scope of the present invention.

More specifically, as exemplified by the first embodiment and the second embodiment, the present invention may be deployed in various forms.

The aforementioned embodiments presented an example of a mouse as the operating device 1 provided with the microswitch 2. However, the present invention is not limited thereto, and allows, for instance, various devices to be adapted to serve as an operating device 1 such as a keyboard used for operational input, various types of pushbuttons, or the like, and allows deployment thereof in various forms.

REFERENCE NUMERALS

1 Operating device
2 Microswitch
Enclosure
200 Insertion hole
201 Guide wall
21 Pressing component
211 Insertion part
212 Shielding part
212a Peripheral wall
212b Inner bottom part
212c Adhesive
22 Contact terminal part
23 Contact mechanism
24 Contact chamber

The invention claimed is:

1. A microswitch comprising:
a contact chamber that accommodates a contact mechanism that opens and closes an electrical circuit;
an enclosure that accommodates the contact chamber; and
a pressing component that accepts a pressure external to the enclosure; wherein:
the pressing component comprises:
an insertion part that is inserted into an insertion hole in the contact chamber and acts on the contact mechanism, the insertion part receiving a pressure external thereto and moving in an insertion direction from a first side that is outward of the enclosure to a second side that is inward of the enclosure; and
a shielding part surrounding the insertion part and positioned between the insertion hole and the contact chamber that shields the insertion hole from the contact chamber, the shielding part comprising a peripheral wall that protrudes at a periphery of the shielding part toward the first side;
the shielding part is larger than the insertion hole and smaller than the contact chamber and extends from the insertion part in a direction orthogonal to the insertion direction to block the insertion hole while moving in the insertion direction with the insertion part;
the enclosure comprises a guide wall that surrounds and encloses the peripheral wall of the shielding part, with a small gap therebetween, the peripheral wall of the shielding part moving relative to the guide wall while the shielding part moves in the insertion direction; and
a surface on a first side of the shielding part facing the insertion hole from the contact chamber and movable in an insertion direction with the shielding part, is sticky.

2. The microswitch according to claim 1, wherein:
the shielding part is plate-shaped.

3. The microswitch according to claim 2, wherein:
a surface on a first side of the shielding part is sticky.

4. The microswitch according to claim 3, wherein:
the shielding part is sticky due to a coating of an adhesive compound or due to adhering an adhesive component.

5. An operation device comprising: a pressing operation part that accepts a pressing operation external thereto; and
the microswitch according to claim 2; the pressing operation part transmitting the pressing operation accepted thereby to the microswitch as a pressure external to the microswitch; and
the operation device outputting a signal on the basis of an operation of the contact mechanism in the microswitch.

6. The microswitch according to claim 1, wherein:
the shielding part is sticky due to a coating of an adhesive compound or due to adhering an adhesive component.

7. An operation device comprising: a pressing operation part that accepts a pressing operation external thereto; and
the microswitch according to claim 6; the pressing operation part transmitting the pressing operation accepted thereby to the microswitch as a pressure external to the microswitch; and
the operation device outputting a signal on the basis of an operation of the contact mechanism in the microswitch.

8. An operation device comprising:
a pressing operation part that accepts a pressing operation external thereto; and
the microswitch according to claim 1; the pressing operation part transmitting the pressing operation accepted thereby to the microswitch as a pressure external to the microswitch, wherein
the operation device outputs a signal on the basis of an operation of the contact mechanism in the microswitch.

* * * * *